(12) United States Patent
Kass et al.

(10) Patent No.: US 8,766,985 B1
(45) Date of Patent: Jul. 1, 2014

(54) GENERATING ANIMATION USING IMAGE ANALOGIES TO ANIMATE ACCORDING TO PARTICULAR STYLES

(75) Inventors: Michael Kass, Berkeley, CA (US); Igor Mordatch, Seattle, WA (US); James Hegarty, Stanford, CA (US)

(73) Assignee: Pixar, Emeryville, CA (US)

( * ) Notice: Subject to any disclaimer, the term of this patent is extended or adjusted under 35 U.S.C. 154(b) by 292 days.

(21) Appl. No.: 13/242,225

(22) Filed: Sep. 23, 2011

Related U.S. Application Data

(60) Provisional application No. 61/433,930, filed on Jan. 18, 2011.

(51) Int. Cl.
*G06T 13/00* (2011.01)

(52) U.S. Cl.
USPC ............................ 345/473; 345/582; 382/181

(58) Field of Classification Search
None
See application file for complete search history.

(56) References Cited

U.S. PATENT DOCUMENTS

| | | | |
|---|---|---|---|
| 6,266,071 B1 * | 7/2001 | Stam et al. ................ | 345/473 |
| 7,973,798 B2 * | 7/2011 | Wei et al. ................. | 345/582 |
| 8,532,387 B2 * | 9/2013 | Winnemoeller et al. ...... | 382/181 |
| 2006/0028481 A1 * | 2/2006 | Zhang et al. .............. | 345/582 |
| 2006/0244757 A1 * | 11/2006 | Fang et al. ............... | 345/582 |
| 2007/0177802 A1 * | 8/2007 | Grabli et al. ............. | 382/187 |
| 2008/0001963 A1 * | 1/2008 | Lefebvre et al. ........... | 345/582 |

OTHER PUBLICATIONS

Kalnins et al., WYSIWYG NPR: Drawing Strokes Directly on 3D Models, ACM Transactions on Graphics (Jul. 2002).*
Kagaya et al., Video Painting with Space-Time-Varying Style Parameters, IEEE TVCG (2009).*
Narain et al., Feature-Guided Dynamic Texture Synthesis on Continuous Flows, The Eurographics Association (2007).*
Hertzmann et al., Curve Analogies, The Eurographics Association (2002).*
Kolmogorov et al., Computing Visual Correspondence with Occlusions using Graph Cuts, IEEE (2001).*
Coherent Stylized Silhouettes, ACM Transactions on Graphics (Jul. 2003).*
Tamponecco et al., Directional Enhancement in Texture-based Vector Field Visualization, Proceedings of the 4th International Conference on Computer Graphics and Ineractive Techniques in Australasia and Southeast Asia (Nov. 2006).*
Ashikhmin, M., "Synthesizing Natural Textures," 13D '01 Proceedings of the 2001 symposium on Interactive 3D graphics, 217-226 (2001), 10 pages.
Bargteil, A. W. et al., "A Texture Synthesis Method for Liquid Animations," ACM SIGGRAPH Symposium on Computer Animation, 345-351 (2006), 7 pages.

(Continued)

*Primary Examiner* — Xiao Wu
*Assistant Examiner* — Greg Raburn
(74) *Attorney, Agent, or Firm* — Kilpatrick Townsend & Stockton LLP (57) ABSTRACT

An animation processor comprises a processor, an instruction memory, a working memory, inputs and outputs, and an input for receiving an input animation sequence comprising a plurality of time-sequenced frames, storage for a style image pair, comprising an input style image and an output style image, wherein differences between the input style image and an output style image convey a style for drawings and other visual elements, logic for generating set of time-varying orientation fields, logic for rendering velocity fields for the sequences, and an output for outputting an output animation sequence that takes on the style specified by the style image pair, with the output animation sequence having temporal coherence.

24 Claims, 6 Drawing Sheets

(56) References Cited

OTHER PUBLICATIONS

Barnes, C. et al., "PatchMatch: A Randomized Correspondence Algorithm for Structural Image Editing," ACM Transactions on Graphics (Proc. SIGGRAPH) 28, 3 (Aug. 2009), 10 pages.

Barnes, C. et al., "The Generalized PatchMatch Correspondence Algorithm," European Conference on Computer Vision (2010), 14 pages.

Benard, P. et al., "A Dynamic Noise Primitive for Coherent Stylization," Computer Graphics Forum (Proceedings of the Eurographics Symposium on Rendering 2010) 29, 4, 1497-1506 (Jun. 2010), 10 pages.

Bonneel, N. et al., "Proxy-Guided Texture Synthesis for Rendering Natural Scenes," $15^{th}$ International Workshop on Vision, Modeling and Visualization (2010), 30 pages.

Freeman, W.T., and Adelson, E.H., "The Design and Use of Steerable Filters," IEEE Trans. Pattern Anal. Mach. Intell 13, 9, 891-906 (1991), 43 pages.

Freeman, W. T., Tenenbaum, J.B., and Pasztor, E. C., "Learning Style Translation for the Lines of a Drawing," ACM Trans. Graph. 22, 1, 33-46 (2003), 14 pages.

Han, J. et al., "Fast example-based surface texture synthesis via discrete optimization," The Visual Computer 22, 9-11 (2006), 8 pages.

Hashimoto, R., Johan, H., and Nishita, T., "Creating Various Styles of Animations Using Example-Based Filtering," Computer Graphics International, 312-317 (2003), 7 pages.

Hertzmann, A. "Curve Analogies," Proceedings of the $13^{th}$ Eurographics Workshop on Rendering Techniques, 233-246 (2002), 13 pages.

Hertzmann, A. et al., "Image Analogies," Proceedings of the $28^{th}$ annual conference on Computer graphics and interactive techniques, SIGGRAPH '01, 327-340 (2001), 14 pages.

Kass, M., and Witkin, A., "Analyzing Oriented Patterns," Computer Vision Graphics and Image Processing 37, 3, 362-385 (1987), 9 pages.

Kwatra, V. et al., "Texturing Fluids," IEEE Trans.Vis. Comput. Graph. 13, 5, 939-952 (2007), 14 pages.

Lefebvre, S., and Hoppe, H., "Appearance-Space Texture Synthesis," ACM Trans. Graph. 25, 3, 541-548 (2006), 8 pages.

Rong, G., and Tan, T.—S., "Jump Flooding in GPU with Applications to Voronoi Diagram and Distance Transform," Proceedings of the 2006 symposium on Interactive 3D graphics and games, ACM, I3D'06, 109-116 (2006), 8 pages.

Taponecco, et al. "Directional Enhancement in Texture-based Vector Field Visualization,"Association for Computing Machinery, Inc., 2006, 9 pages.

Wei, L.—Y. et al., "State of the Art in Example-based Texture Synthesis," Eurographics 2009, State of the Art Report, EG-STAR, Eurographics Association (2009), 25 pages.

Wei, L.—Y., and Levoy, M. "Fast Texture Synthesis using Tree-structured Vector Quantization," SIGGRAPH, 479-488 (2000), 10 pages.

\* cited by examiner

Input A​ ​ ​ ​ ​ ​ Output A

Input B​ ​ ​ ​ ​ ​ Output B

GENERATING ANIMATION USING IMAGE ANALOGIES TO ANIMATE ACCORDING TO PARTICULAR STYLES

CROSS-REFERENCE TO RELATED APPLICATIONS

This application claims priority from and is a non-provisional of U.S. Provisional Patent Application No. 61/433,930 filed Jan. 18, 2011 entitled "Animating with Image Analogies" which is hereby incorporated by reference, as if set forth in full in this document, for all purposes.

FIELD OF THE INVENTION

The present invention relates to computer animation in general and in particular to computer animation that combines computer-specified objects with style examples to form stylized animation.

BACKGROUND

Image stylization is a process of creating an image according to a particular style, where an input image and a style can be combined so that an output image is the input image produced according to the style. The style can be specified by a set of image analogies, often represented by an input style image and an output style image. By analogies, an image converter will take in the input image and create an output image that is to the input image as the output style image is to the input style image.

[HERTZMANN, A. et al., *Proceedings of the 28th annual conference on Computer graphics and interactive techniques*, SIGGRAPH '01, 327-340 (2001)] described image stylizations using analogies. Their method begins with a user-supplied image A and its analogy A'. When given an additional input image B, the method computes an output image B' with the property that visually B' is to B as A' is to A. The images A and A' effectively define a style, and that style is applied to the input image B. Many of the results achieve an appealing hand-painted or drawn appearance.

A wide variety of stylizations can be described by regions of pattern (e.g., watercolor or charcoal texture, cross-hatching, etc.) delineated by some kind of outlines. [BÉNARD, P. et al., *Computer Graphics Forum (Proceedings of the Eurographics Symposium on Rendering* 2010) 29, 4 (june), 1497-1506 (2010)] defines three goals they say are necessary for successful temporal coherent stylization of pattern: (1) flatness, (2) coherence motion and (3) temporal continuity. In addition to these three, to achieve the warmth of hand-drawn or hand-pointed imagery in the medium of computer animation, a fourth goal is also to be considered in that outlines should be taken into account.

What might be useful to still image analogies is a counterpart in animation, wherein the input is an animation sequence, i.e., a series of frames that convey motion of objects in a scene. When the input is a sequence of images that convey movement, additional difficulties arise that should be dealt with to result in a pleasing animation sequence.

The concept of image analogies is known, as is the wider field of texture synthesis. However, animation adds new complications. A number of researchers have investigated the use of texture synthesis for creating temporal image sequences, but none have specifically addressed the problems of using texture synthesis to author high-quality non-photorealistic renderings of character animation. [WEI, L.-Y. et al., *Eurographics* 2009, *State of the Art Report, EG-STAR*, Eurographics Association (2009)] refers to flow-guided texture synthesis including the synthesis of video exemplars and texturing fluids, which combines texture synthesis with advection, but uses it to address different problems. [BARGTEIL, A. W. et al., *Symposium on Computer Animation*, 345-351 (2006)] and [KWATRA, V. et al., *IEEE Trans. Vis. Comput. Graph.* 13, 5, 939-952 (2007)] synthesize temporally coherent textures on the surface of liquids to create surface details such as waves or bubbles and [HAN, J. et al., *The Visual Computer* 22, 9-11 (2006)] synthesizes animated patterns on the surface of 3D meshes to help visualize flow fields. [WEI, L.-Y., AND LEVOY, M. *SIGGRAPH*, 479-488 (2000)] shows the synthesis of video textures, but they still do not solve the basis problems.

[HASHIMOTO, R., JOHAN, H., AND NISHITA, T., *Computer Graphics International*, 312-317 (2003)] applied the image analogies approach to low-resolution video sequences using motion estimation to increase temporal coherence. With the combined problems of inaccurate motion estimation, no explicit handling of occlusion and low overall resolution, the results cannot be described as high-quality.

[BONNEEL, N. et al., *15th International Workshop on Vision, Modeling and Visualization* (2010)] used guided texture synthesis to create a system that targets near-interactive pre-visualization of natural environments. The system is well-designed for its target purpose, as it provides the quality needed for pre-visualization using only very approximate geometry while operating within the constraints of near real-time performance. The application of character animation, however, demands a much higher-quality result, and one with better temporal coherence. At the same time, it can accept much slower running times.

There is, of course, a large literature on non-photorealistic stylization techniques that rely on explicit vector representations of lines or strokes. [FREEMAN, W. T., AND ADELSON, E. H., *IEEE Trans. Pattern Anal. Mach. Intell.* 13, 9, 891-906 (1991)] and [HERTZMANN, A., *Proceedings of the 13th Eurographics Workshop on Rendering Techniques*, 233-246 (2002)] have investigated example-based stylizations of vector methods. Extracting high-quality time-coherent vector representations from traditional 3D character animation, however, remains a difficult problem, so vector approaches have thus far been used only in limited contexts or with models constructed for particular styles.

REFERENCES

[ASHIKHMIN] ASHIKHMIN, M., *I3D* '01, 217-226 (2001)
[BARGTEIL] BARGTEIL, A. W. et al., *Symposium on Computer Animation*, 345-351 (2006)
[BARNES09] BARNES, C. et al., *ACM Transactions on Graphics (Proc. SIGGRAPH)* 28, 3 (Aug.) (2009)
[BARNES10] BARNES, C. et al., *European Conference on Computer Vision* (2010)
[BÉNARD] BÉNARD, P. et al., *Computer Graphics Forum (Proceedings of the Eurographics Symposium on Rendering* 2010) 29, 4 (june), 1497-1506 (2010)
[BONNEEL] BONNEEL, N. et al., *15th International Workshop on Vision, Modeling and Visualization* (2010)
[FREEMAN91] FREEMAN, W. T., AND ADELSON, E. H., *IEEE Trans. Pattern Anal. Mach. Intell.* 13, 9, 891-906 (1991)
[FREEMAN03] W. T., TENENBAUM, J. B., AND PASZTOR, E. C., *ACM Trans. Graph.* 22, 1, 33-46 (2003)
[HAN] HAN, J. et al., *The Visual Computer* 22, 9-11 (2006)

[HASHIMOTO] HASHIMOTO, R., JOHAN, H., AND NISHITA, T., *Computer Graphics International*, 312-317 (2003)

[HERTZMANN01] HERTZMANN, A. et al., *Proceedings of the 28th annual conference on Computer graphics and interactive techniques*, SIGGRAPH '01, 327-340 (2001)

[HERTZMANN02] HERTZMANN, A., *Proceedings of the 13th Eurographics Workshop on Rendering Techniques*, 233-246 (2002)

[KASS] KASS, M., AND WITKIN, A., *Computer Vision Graphics and Image Processing* 37, 3, 362-385 (1987)

[KWATRA] KWATRA, V. et al., *IEEE Trans. Vis. Comput. Graph.* 13, 5, 939-952 (2007)

[LEFEBVRE] FEBVRE, S., AND HOPPE, H., *ACM Trans. Graph.* 25, 3, 541-548 (2006)

[RONG] RONG, G., AND TAN, T.-S., *Proceedings of the 2006 symposium on Interactive 3D graphics and games*, ACM, I3D'06, 109-116 (2006)

[WEI100] WEI, L.-Y., AND LEVOY, M. *SIGGRAPH*, 479-488 (2000)

[WEI109] WEI, L.-Y. et al., *Eurographics* 2009, *State of the Art Report, EG-STAR*, Eurographics Association (2009)

BRIEF SUMMARY OF THE INVENTION

In embodiments of the present invention, an animation processor might include a processor, instruction memory, working memory and inputs and outputs. The animation process, when programmed to create analogy sequences, receives an input animation sequence comprising a plurality of time-sequenced frames, reads in a style specification comprising an input style image and an output style image, and outputs an output animation sequence that takes on the style specified. In order to do so, the animation process generates a set of time-varying orientation fields and renders velocity fields for the sequences, and generates the output animation sequence with temporally coherent output.

In specific embodiments, temporal coherence is addressed by either a parallel (in space and time) process or a time-serial, space-parallel process that each reduces incidence of flashing, popping or sliding of textures even with imperfect lines and other boundaries. Styles can be generalized over arbitrary orientations. A GPU implementation of the time-serial process achieves short synthesis times with high-quality results.

Using these techniques, image analogies are used in the production of non-photorealistic rendering of computer graphic character animation to capture the warmth of hand-made renderings.

The following detailed description together with the accompanying drawings will provide a better understanding of the nature and advantages of the present invention.

DETAILED DESCRIPTION OF THE EMBODIMENTS

Various processes and apparatus for creating non-photorealistic renderings of animation, character or otherwise, reusing some traditional modeling and animation pipelines is explained in detail herein. In an example process, an image processor (computer, hardware, software, etc.) is provided with a style package that defines a drawing "style" and an input image and the image processor outputs an output image corresponding to the input image, but drawn in the defined drawing style. The image processor might also output additional information that might be used in a pipeline to inform the processing of other input images. The style package might comprise an input style image, an output style image, and possibly other parameters that are part of the definition of the style.

In processing images, the image processor works efficiently, so that output images can be created in a timely manner. The image processor also handles flatness (so that images appear drawn on a surface), coherent motion control (so that textures of objects appear to move with the object—but this might be artist-controllable), provides for temporal continuity (reducing popping or other artifacts), and also handles object outlines and occlusions in the animation.

Figure 1:
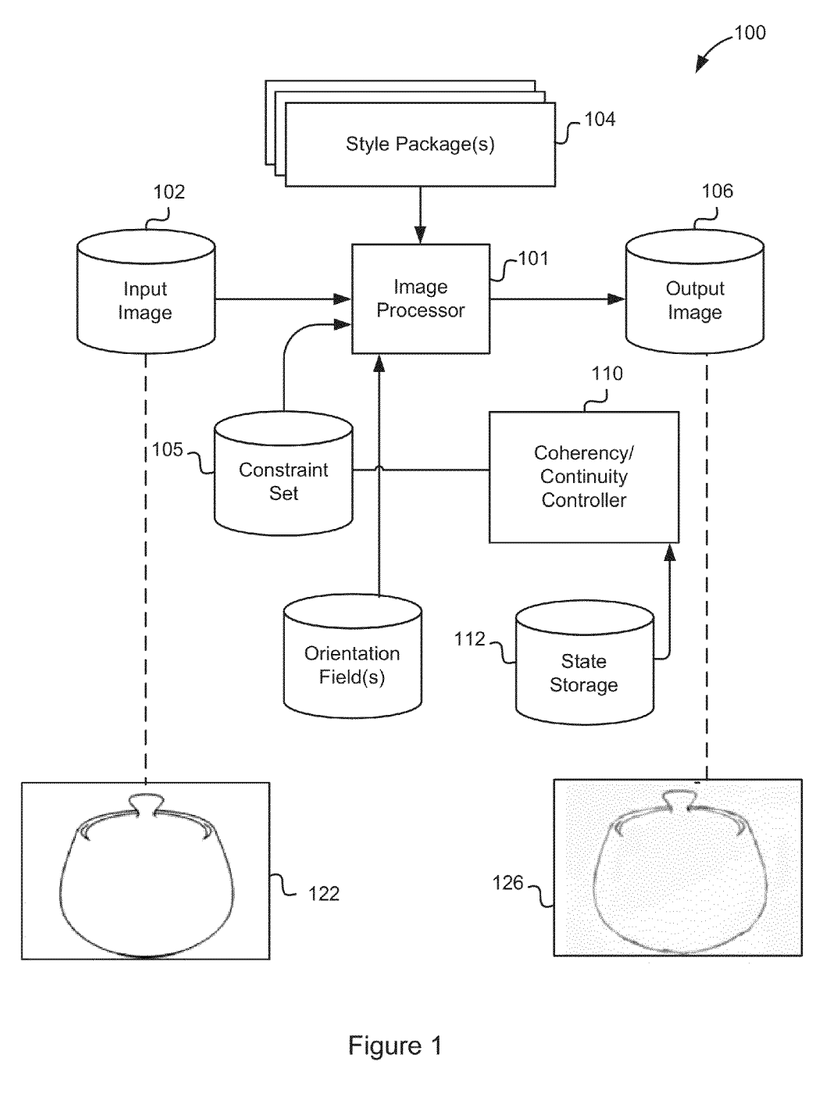
FIG. 1 illustrates a computer animation system according to aspects of the present invention.

FIG. 1 illustrates a computer animation system 100 in which an image processor 101 processes an input image 122 according to a selected style package 104 (and possibly also a constraint set 105) to form an output image 122 and possibly also output parameters to a coherency/continuity controller 110 that, along with stored state information 112, generates constrain data for subsequent images. It should be understood that input image 122, style package 104, output image 126 and various other data used is stored or can be stored on tangible computer readable media and some of the images and/or data can be streamed, to be input or output as needed.

A computer animation system such as system 100 might include other elements not explicitly shown, such as input hardware to allow an artist or other user to create input image 102, or at least provide user inputs to a computer process that generates input image 102 from instructions or primitives input by the user. System 100 might also include a display to present output images, input images or other data. The devices or elements used for image input can also be used for generating the elements of a style package (described in further detail below).

It should also be understood that elements shown separately, to highlight their functions, might be implemented as part of integrated software. For example, FIG. 1 shows image processor 101 and controller 110 as being separate elements, but they might be integrated. Processes and functionality described herein can be implemented in software that runs on a processor or computer device, hardware specifically for these processes, and/or stored on computer-readable medium as sequences of processor instructions. Input image 102 (as well as other images), might be represented by computer-readable data structures in conventional or unconventional image formats.

In one example of an operation, an artist (as used herein, users who input image elements or style features are referred to as "artists") provides an input image or a sequence of input images. For example, the input might be an animation sequence of a non-photorealistic teapot jumping. The artist (the same artist or a different artist) provides a style package that might comprise an input style image and an output style image. The output style image might have been created by presenting an artist with the input style image and asking the artist to draw (e.g., using an image input device) the input style image using a particular drawing style that is to be captured.

Overview of Image Processing

At a high level, image processor 101 outputs an output image sequence based on an input image sequence, a style package and possibly other inputs and parameters. At just a little more detailed level, image processor 101 processes an input image to form an output image, taking into account temporally near input images (i.e., images in the image sequence that are adjacent to, or close to, the target input image), prior formed output images, an advection image (i.e., a frame representing the target image modified according to a velocity field), an orientation field (although it is possible to do the process without using orientation), wherein the output image is generated from a 2D array of pointers to points in the output style image of the style package being used.

The 2D array of pointers can be a mapping, M, that maps each point, p, on the output image to a corresponding point, M(p), on the output style image. The points need not be pixels. In fact, sometimes the results are better when the mappings comprise multi-pixel patches, i.e., where adjacent pixels on the output image point to adjacent pixels or points on the output style image. Many such mappings might work equally well—there does not have to be one best solution. Once a mapping is determined for an output image, the output image can be easily generated, simply by assigning each pixel, p, of the output image the pixel color value found at the point M(p) in the output style image. For color images, the style images might have multiple components.

In determining the mapping to use, image processor 101 might start with an initial mapping, such as the mapping of an immediately prior output image, directly or after application of an advection using a velocity field and possibly taking into account occlusions. The velocity fields and occlusions might be derived from geometric 3D models or other methods. The initial mapping might be at the resolution of the output image, or might be at some lowered resolution, such as a resolution wherein the typical feature in the output style image is a single pixel feature. At the lowered resolution, the image processor can generate a mapping, use that mapping on a higher resolution image and move back up to the full resolution.

From the initial mapping, the image processor can evaluate a goal seeking function, make some adjustments, check a new value for the goal function and iterate until a better goal function value is obtained. In examples herein, a lower value for the goal function is preferred. In some embodiments, the fully-parallel embodiments, the goal function considers temporal data as well as spatial data. In other embodiments, the time-serial embodiments, the goal seeking function evaluates a mapping based on the current target image, but provides a bonus (i.e., favors) to promote temporal consistency in the current target output image by considering already generated output images.

In some time-serial embodiments, there are multiple passes. For example, the image processor might have one pass through the input image sequence, from start to finish, and each time a current target output image is being generated, taking into account the output image for the immediately prior frame. While the immediately subsequent input image (frame) is available, the output image is not yet available. Once the first pass is complete, the image processor can run backwards through the output images, improving on the goal seeking function where possible by considering the now-available output images in the other direction. In the second and subsequent passes, the goal seeking function can consider images on both sides of the current target image being processed.

The goal seeking function at a particular pixel position of the output style image can take into account advection in one or both time directions (i.e., one or more frames back, one or more frames forward). Advection can also take, instead of the advection of the present input image frame backwards, the output image frame (e.g., post-stylization) for use as a candidate or as input to the goal seeking function. The goal seeking function also takes into account temporal continuity, but also gates the temporal continuity so that it is not taken into account, or its influence is diminished, under certain circumstances, such as where there is occlusion or significant changes in z value (depth).

Texture synthesis has been used to generate texture of moving surfaces, but typically does not have to deal with multiple objects that can occlude each other. Temporal coherence is more difficult when occlusions need to be dealt with. As explained herein, temporal coherence can be provided for, in part, by changing weights in the goal seeking function components. In particular, where occlusions have to be dealt with, weights for neighboring pixels can be filtered out or lowered so that the result looks good.

The orientation field can be used in the texture synthesis process as an input, in addition to the input images. An example of the orientation field can be a 2D array of orientations, wherein an orientation is associated with a pixel or point in an input image or is to be associated with a pixel or point in an output image. An orientation value indicates, for that pixel or point, a preferred direction of a line (or brush stroke, etc.) passing through that point. As explained herein, orientation might be computer-generated or artist-generated, the latter to allow for artistic input. In some cases, the input image does not contain enough information alone to provide orientation clues, so that information might be derived from the underlying geometric models used to generate the input image. Once the orientation field is known, then that can be used to select appropriate portions of the output style image that have similar orientations (or are rotated to have similar orientations).

The orientation field can be constrained to be consistent from frame to frame, but in some cases, the stability of the orientation field is a result of the input being consistent. With the orientation fields known, the image processor can then rotate the output style image per the orientation field and perform texture synthesis using the rotated output style image.

For a given image in the image sequence, the goal seeking process can use the orientation field also uses paths, images or other information about temporally nearby image details.

Guided texture synthesis can use analogies, so that when a match between a portion of the input image and a portion of the input style image are aligned (and possibly involving a rotation for cases where the orientation of a line in the portion of the input image is not an orientation already present in the input style image), the corresponding portion of the output style image is used for the output image.

Thus, a pixel color for a pixel of the output image is determined by considering styles and input pixels, along with neighboring pixels (neighboring in time as well as in space), an orientation for lines at that pixel, and possibly other considerations. To guide the process towards an optimal or suitable solution, a goal seeking function might be used that takes in various inputs, weights them and provides an output value that is optimized for.

Advection can be used to generate candidate images to use a starting point or as an influence on the goal seeking process. For example, texture synthesis might occur with forward advection to come up with a first candidate and then backward advection to come up with a second candidate and use those to influence the mapping. Where the stylized frame is available, that can be used instead of the input frame.

The goal seeking function can be evaluated at each point or pixel, but some optimization might be done so that every combination need not be considered. Thus, the goal seeking function might be applied to some localized search space to find a local optimum. In general, one goal is to make each patch of the output image to look like some patch in the output style map. The goal function can take into account size of the patches, with larger patches being preferred over smaller patches, but also considering advection, orientation and depth movement.

Style Package Generation

Figure 2:
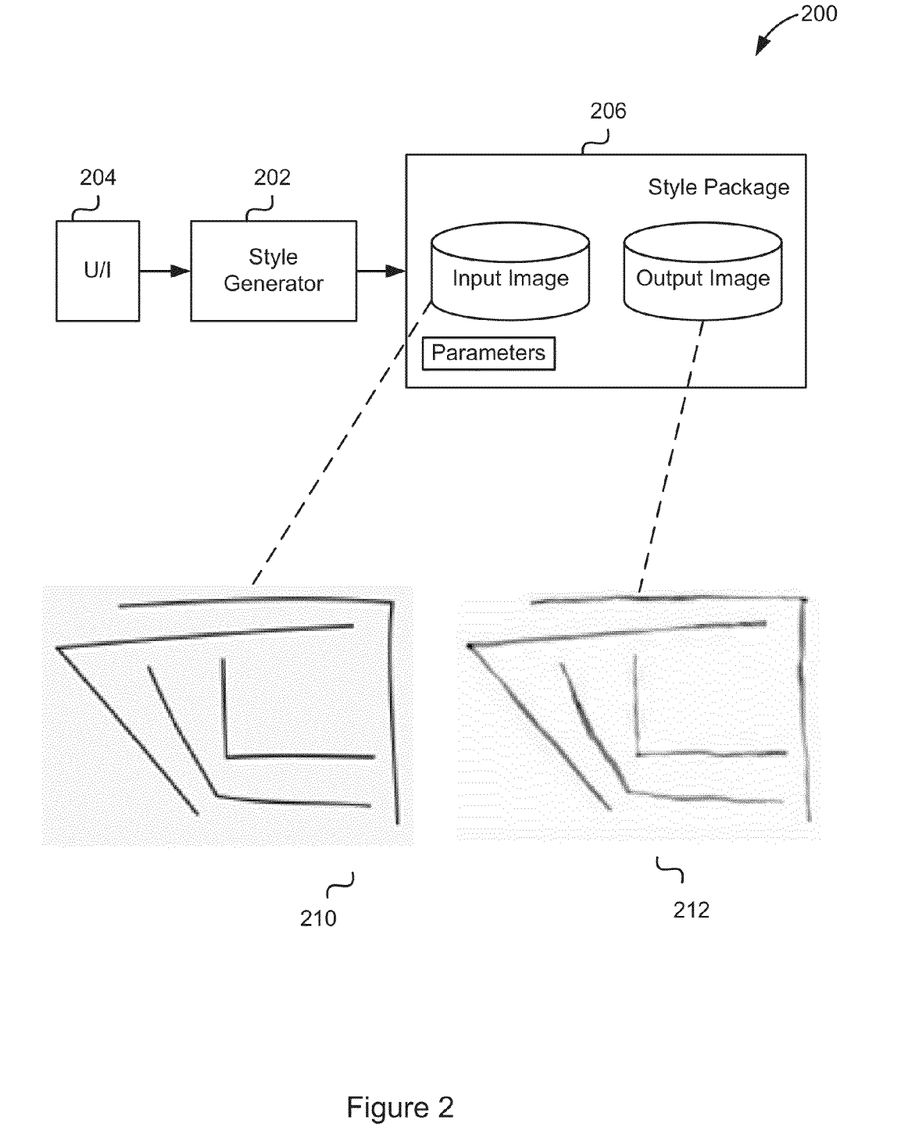
FIG. 2 illustrates an apparatus that might be used to generate style packages for an image processor.

FIG. 2 illustrates an apparatus 200 that might be used to generate the style packages that the image processor uses. As illustrated there, an artist might use a user interface 204 to provide input to a style generator 202, which would in turn output a style package 206. In this example, a style package is represented as a data structure having a pair of images and possible also some additional details to further define the style. An example input style image 210 might be generated by a computer or selected by an operator. Style generator 202 then provides the artist with a view of input style image 210 and requests entry of the corresponding output style image 212.

Figure 3:
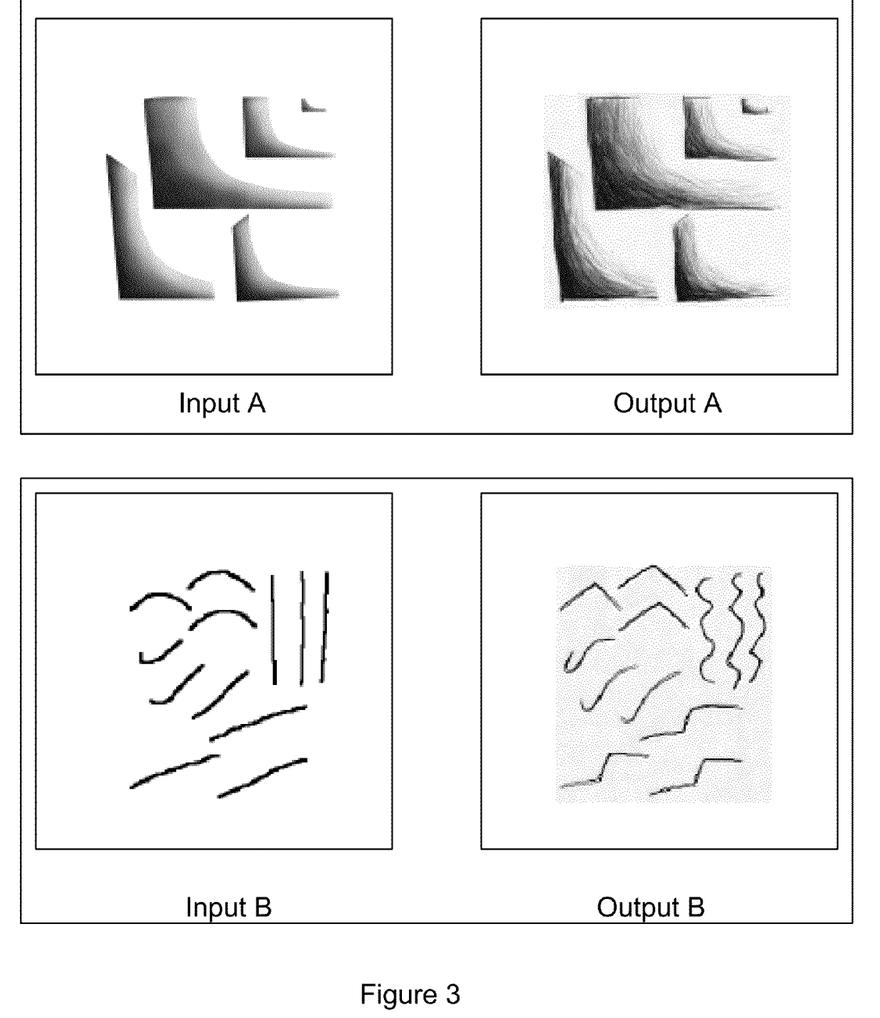
FIG. 3 illustrates additional examples of style packages.

FIG. 3 illustrates additional examples of style packages.

Single Image Process

In this section, the operation of the image processor on one input image is described and later sections explain the operation and use of this process considering multiple images.

FIGS. 1-2 provide examples of an input image 122 (referred to in equations as "I") stored in image storage 102, an output image 126 (referred to in equations as "Î") stored in image storage 106, an input style image 210 (referred to in equations herein as "S"), and an output style image 212 (referred to in equations herein as "Ŝ"), where the pair of style images define, in part, a style. For this example, the output style shown is a set of messy hand-painted brush strokes supplied by an artist on paper and then scanned, while the input style image is generated using a drawing program, to provide a carefully-aligned, clean, computer-generated line drawing. In some embodiments, the output style image is created first and in others the input style image is created first. Input image 122 is a computer line-rendering of a teapot, and the image processor generates an output image of the teapot that appears to be hand-drawn, rather than being generated by a computer.

Orientation

Even though the style images contain lines of only a limited set of orientations, the output image contains segments of lines at various other orientations. This can be addressed by using two orientation fields, one defined in the coordinate system of the style images ($0 \leq D_s(p) < \pi$) and one defined in the coordinate system of the input and output images ($0 \leq D_i(p) < \pi$). The image processor can use rotations to compensate for the different local orientations.

There is an inherent ambiguity in the orientation of patterns that resemble lines or stripes because a rotation by an angle of $\pi$ will leave the dominant orientation unchanged. As a result, the appropriate rotation is also ambiguous. To prevent a visible branch cut, the image processor can use the smallest angle of rotation $\phi(p_1, p_2)$ that brings the two directions $D_i(p_1)$ and $D_s(p_2)$ into alignment. In some embodiments, the style images actually comprise two copies of a basic image, one in one orientation and the other rotated by $\pi$. The orientation fields $D_i(p)$ and $D_s(p)$ can either be authored by a user for complete control, or computed automatically.

Figure 4:
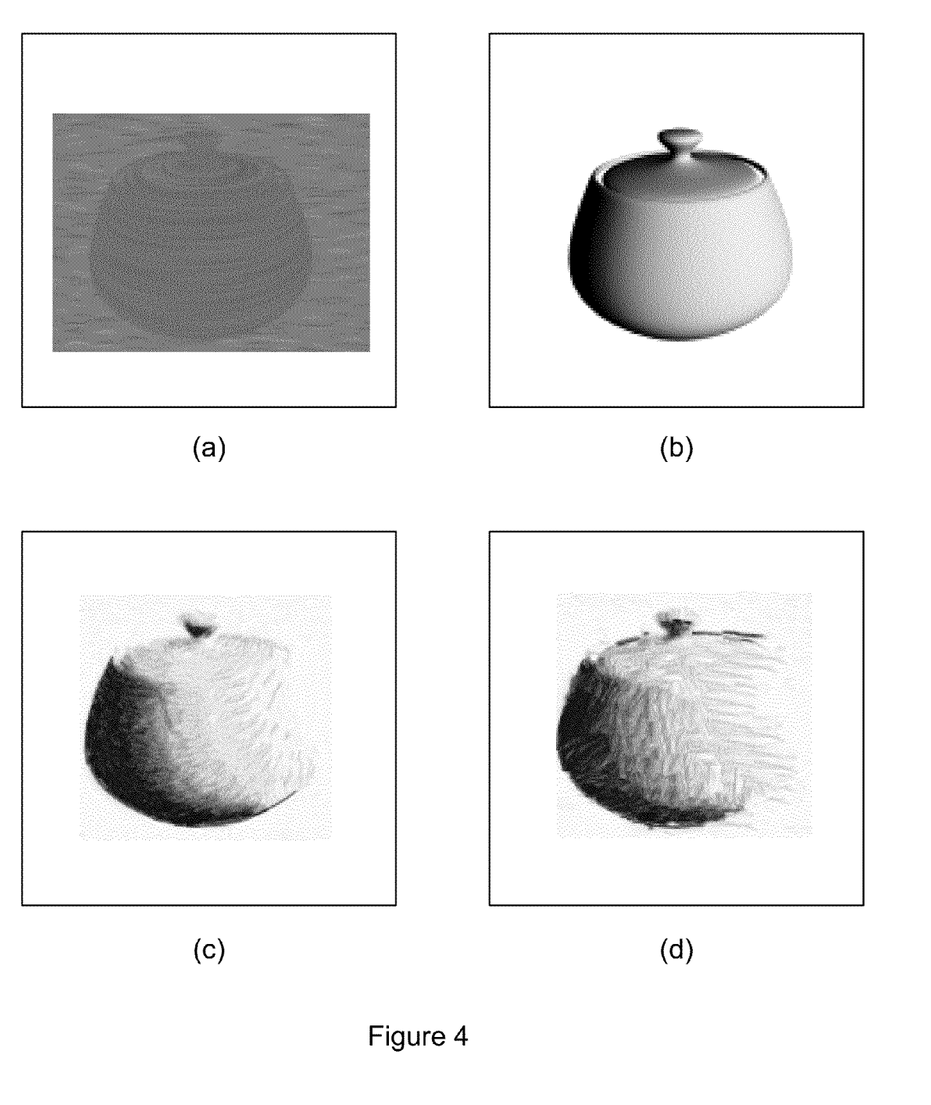
FIG. 4 illustrates an authored orientation field and its effects.

FIG. 4 illustrates an authored orientation field and its effects. FIG. 4(a) shows the authored orientation field, while FIG. 4(b) shows the input image, FIG. 4(c) shows an output image using the orientation field of FIG. 4(a) and FIG. 4(d) shows an output image without using the orientation field of FIG. 4(a), where instead, the image was authored using parametric coordinates on the teapot and the background. Stretched textures are used to illustrate the orientation field. The orientation fields might be automatically generating using, for example, the image-processing method of [Kass], which is equivalent to doing a local principal component analysis on the image gradients and taking the orientation perpendicular to the eigenvector with the largest eigenvalue. Defining orientations directly on a 3D model provides the opportunity for greater control, at the cost of additional labor.

Mapping

As explained above, the output image is generated from a mapping, M, from each point, p, on the output image to a corresponding point, M(p), on the output style image. The output image, Î(p), is then formed from the output style as Î(p)=Ŝ(M(p)). In the language of [WEI, L.-Y. et al., *Eurographics* 2009, *State of the Art Report, EG-STAR*, Eurographics Association (2009)], this might be considered a "pixel-based" texture synthesis method, where a fundamental operation is to change the mapping at an individual output pixel. This mapping of an individual pixel, M(p), is referred to herein as an "offset". While the output is sampled on a pixel grid, the offsets M(p) that give rise to it are floating point vectors. When evaluating style colors and other quantities off the grid, bilinear interpolation can be used.

Goal Function

As explained above, a goal seeking function, or goal function, is used by the image processor to evaluate whether changes or searches in a local search space provide what is deemed to be a better result. The image processor performs repeated evaluations of a goal function for the offset at individual pixels. When new offsets are found that improve the goal function, those offsets are updated. The goal function is a property of a local neighborhood and has the form shown in Equation 1.

$$G(p) = \sum_{\Delta p \in \Omega} w(\Delta p) g(p, \Delta p) \quad \text{(Eqn. 1)}$$

In Equation 1, $\Omega$ represents the set of vectors from p to its neighbors. In some embodiments, 11×11 pixel square neighborhoods are used, but other sizes might work as well. The weights, $w(\Delta p)$, give more importance to samples near the center of the neighborhood. In some embodiments, the image processor uses weights with Gaussian falloff, as in Equation 2.

$$w(\Delta p) = e^{-|\Delta p|^2 / 2\sigma^2} \quad \text{(Eqn. 2)}$$

In the case of still-image synthesis, the overall goal function is constructed as the weighted sum of three contributing goal functions, each representing a distinct aim of the synthesis, as in Equation 3.

$$g(p, \Delta p) = (w_a g_a(p, \Delta p) + w_b g_b(p, \Delta p) + w_c g_c(p, \Delta p)) \quad \text{(Eqn. 3)}$$

In Equation 3, the weights ($w_a$, $w_b$, and $w_c$) might be use controlled so as to allow the user to balance the relative importance of the different goals.

The first goal ($g_a$) is to make each local neighborhood of the output image near p look like a corresponding neighborhood of the output style image near M(p). In order to compare the neighborhoods of the output image and the output style image, the image processor considers the rotation $\phi(p, M(p))$ between the local coordinates of the input and the style images. Let $Rot_\phi$ denote the rotation of a vector by an angle $\phi$. Then, the point in the output style image corresponding to $p+\Delta p$ in the output image is given by Equation 4.

$$C(p,\Delta p)=M(p)+Rot_\phi(\Delta p) \qquad (Eqn. 4)$$

Putting this together results in Equation 5, that expresses the goal of having each neighborhood in the output image look like a corresponding neighborhood of the output style image.

$$g_a=|\hat{I}(p+\Delta p)-\hat{S}(C(p,\Delta p))|^2 \qquad (Eqn. 5)$$

Note that these operations can be done in the RGB color space, the Lab color space or other color spaces.

The second goal ($g_b$) is for the offsets to be chosen so that each neighborhood of the input image will be matched to a neighborhood of the input style image that looks similar. This can be done by the goal function shown in Equation 6.

$$g_b=|I(p+\Delta p)-S(C(p,\Delta p))|^2 \qquad (Eqn. 6)$$

Finally, the third goal ($g_c$) is for the mapping $p \rightarrow M(p)$ to be as continuous as possible, which might be provided by Equation 7 being evaluated by the image processor.

$$g_c=\min(|M(p+\Delta p)-C(p,\Delta p)|^2, r_{max}) \qquad (Eqn. 7)$$

In this third goal component, it is the squared distance between the actual offset at $p+\Delta p$ and the offset one would expect from p if the offset field was a simple rotation of the style output, bounded by a limit, since the important error is how much of the mapping is continuous rather than the actual distance in the style images between discontinuous offsets.

With the use of sizeable neighborhoods in $g_a$ and $g_b$ that produce a spatial coherence in the offsets, a small value of $w_c$ might be sufficient.

Figure 5:
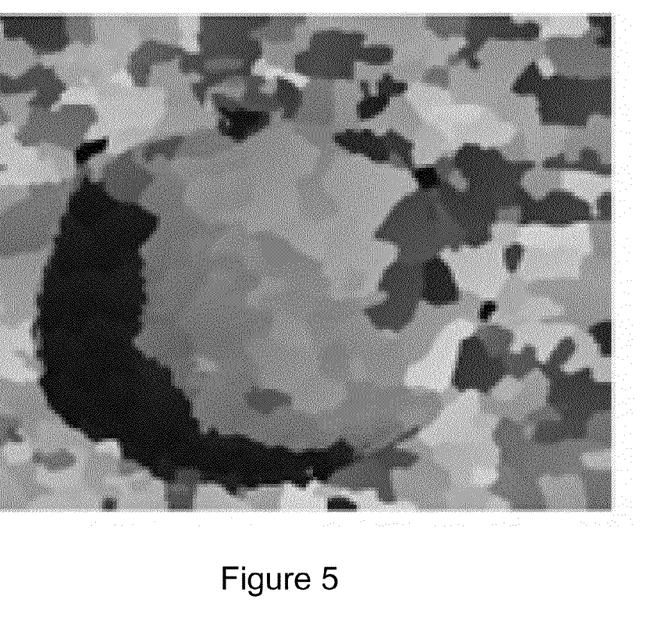
FIG. 5 illustrates a resulting offset field image.

FIG. 5 illustrates a resulting offset field (i.e., M(p) over the image) in shading to indicate coherence. In FIG. 5, one coordinate of the offset field is mapped to a red channel of the image and the other coordinate to the green channel, revealing the shape of the coherent regions (shown here in monochrome).

Figure 6:
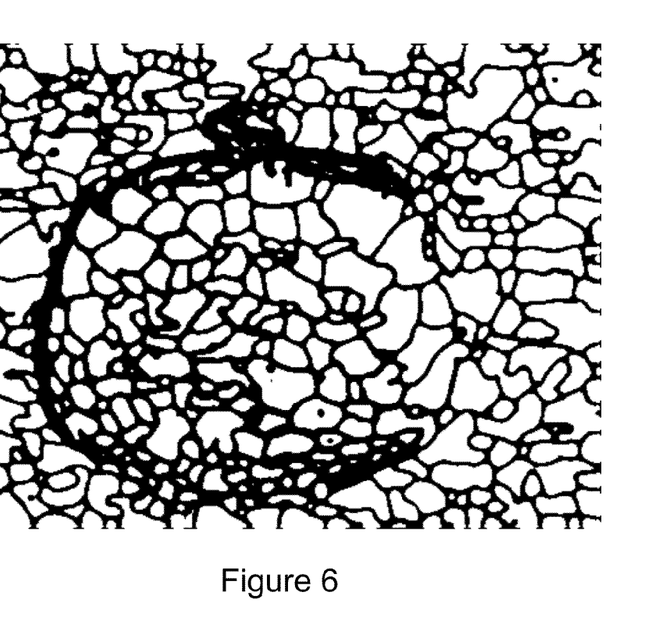
FIG. 6 illustrates another way of visualizing the regions shown in FIG. 5.

FIG. 6 illustrates another way of visualizing the regions of FIG. 5. There, the darkness is mapped to the goal function at each point. The goal function is low (i.e., the image is lighter) except near boundaries of the coherent regions. This is to be expected, since neighborhoods that cross boundaries will not match the output style nearly as well as neighborhoods that do not.

Coarse to Fine Synthesis

The full state space for pixel-based texture synthesis is extremely large; the dimensionality is twice the number of pixels in the output. As a result, it is very easy for any method to fall into a local minimum. Fortunately, a globally optimal solution is not required, as a reasonably good local minimum will suffice in most cases, since the proper transformation of a given input image into a hand-made style is generally far from unique.

In processing an image, the image processor might down-sample all images by factors of two (or other factor, but two is convenient) in both dimensions until a single pixel in the down-sampled output corresponds to the typical feature size in the output style textures. At this level, the mapping, M(p), can be initialized with random offsets and optimized at the coarse level, be up-sampled, and then have the up-sampled result used as a starting point to optimize the next finer level. This is repeated this until the resolution is back to the original sampling, which yields the final output.

At each coarse-to-fine resolution level, the image processor performs an optimization. An example might be the parallel version of PatchMatch described in [Barnes09] based on jump flooding described in [RONG, G., AND TAN, T.-S., *Proceedings of the 2006 symposium on Interactive 3D graphics and games*, ACM, I3D'06, 109-116 (2006)]. PatchMatch is fast algorithm for computing dense approximate nearest neighbor correspondences of image neighborhoods for arbitrary distance functions. It is a randomized algorithm that relies on iteratively improving a set of correspondences until convergence. After a random initialization, the algorithm combines propagation steps with random search. In the propagation steps, the algorithm attempts to improve the nearest neighbor correspondences by testing adjusted correspondences derived from the correspondences of neighbors. In the random search step, randomly selected correspondences are sampled from an exponential distribution. The combination is remarkably effective, and has been shown to perform very well in comparison with other available algorithms. See, e.g., [BARNES, C. et al., *European Conference on Computer Vision* (2010)].

In the spirit of a Jacobi iteration, the parallel version of PatchMatch independently computes updates for each nearest-neighbor correspondence in parallel, without regard for the impact of one update on another. The updates are then applied together and the process repeated. While a single pass of the parallel update is less effective than a serial update, the speed-up due to parallelism on GPUs (graphics processing units) more than compensates, and makes this an attractive scheme.

Fully-Parallel Temporal Processing

In the case of animation, the input is a sequence of images, $I_t(p)$, over time, along with their time-varying orientation fields. Preferably, the stylistic qualities of the static results are maintained while creating temporally coherent output. In addition to the fully-parallel (i.e., parallel in space and parallel in time) approach of this section, there is the time-serial approach described in a later section.

With the fully parallel approach, time and space are treated as symmetrically as possible. On a suitably large cluster of computing machines with high-speed networking or on a large, very parallel machine, this may be the best choice, whereas the time-serial approach achieves its parallelism in the spatial dimensions and makes sequential passes over the data along the time dimension. While that exposes less parallelism, it reduces the working set to size that fits easily into current GPUs. As a result, given the current state of hardware, it is more cost-effective, but this can change as hardware changes.

In order to extend the texture synthesis appropriately to animation, the image processor uses additional information beyond just a static image. Specifically, it is provided with information about know how things move and when they become occluded or disoccluded. This can be developed by rendering velocity fields for the input animation sequences. Let $I_t$ be the input image of an animation sequence for a frame at time t. The data in the input image is augmented by rendering two velocity fields, $V_t^+(p)$ and $V_t^-(p)$. The first field is a forward finite difference of screen-space velocity. A point visible at p in frame t moves to $p+V_t^+(p)$ in frame t+1. Similarly, the second field is a backward finite difference of screen-space velocity. A point visible at p in frame t came from to $p-V_t^-(p)$ in frame t−1. These velocity fields are straightforward to generate for animation systems that support motion blur and programmable shaders.

Using these velocity fields, the image processor can construct paths $\pi_{\Delta t}(p, t)$ following the motion of each point by integrating $V^+$ forwards in time according to Equation 9 below and integrating $V^-$ backwards in time according to Equation 10 below, starting with Equation 8.

$$\pi_0(p,t)=p \quad \text{(Eqn. 8)}$$

$$\pi_{\Delta t}(p,t)=\pi_{\Delta t-1}(p,t)+V^+(\pi_{\Delta t-1}(p,t),t+\Delta t-1) \quad \text{(Eqn. 9)}$$

$$\pi_{\Delta t}(p,t)=\pi_{\Delta t+1}(p,t)+V^-(\pi_{\Delta t+1}(p,t),t+\Delta t+1) \quad \text{(Eqn. 10)}$$

Temporal Continuity

In order to produce good looking animation, temporal continuity is preferable enforced, but not where inappropriate. In some embodiments, appropriateness is determined by two criteria, one criterion covering the possibility of occlusion and the second concerning stretch or compression.

The function $V_t^+(p)$ indicates where p will project in the next frame, and $V_t^-(p)$ indicates where p projected in the previous frame. Neither function, however, indicates whether or not those projected locations were occluded. To determine that, the image processor renders z-buffers for the frames as well as the z-components of the forward- and backward-difference velocities. From the z-value of a point $\pi_{\Delta t}(p, t)$ and the z-component of its forward-difference velocity, the image processor can compute its expected depth at the next frame. If the z-value found in the z-buffer is closer, then the point is occluded. Similarly, with the backward differences, the image processor can compute visibility for $\Delta t<0$.

Due to sampling errors on the pixel grid, quantization of the z values and the possibility of time-varying tesselation, the z test for occlusion uses a threshold. As a result, it is useful to make the test more robust by also rendering object IDs, wherein a point is considered to be occluded if either the z-buffer test shows another object in front or if object IDs fail to match.

Besides occlusion, there is a second important reason to turn off temporal coherence. When objects come closer or recede from the camera, their size in screen space changes. In this case, the goals of temporal continuity and flatness are at odds with each other. Perfect temporal continuity requires that texture elements stretch or compress to avoid changing the color of any given point. Perfect flatness, however, requires that the size of the texture elements remain constant in screen space. This is necessary to produce the illusion that the texture elements were applied by an artist to a canvas rather than having been painted or texture mapped onto the moving 3D objects. In order to achieve a hand-drawn or hand-painted look, flatness must trump temporal continuity. To do that, temporal continuity is disabled when the stretch becomes large.

Let $\Omega^*(p)$ represent the immediate 4-connected pixel neighbors of a given pixel, p. Then, consider the stretch represented in Equation 11.

$$\gamma_{\Delta t}(p, t) = \max_{\Delta p \in \Omega^*}(|\pi_{\Delta t}(p+\Delta p, t)-\pi_{\Delta t}(p-\Delta p_i, t)|/|2\Delta p|) \quad \text{(Eqn. 11)}$$

In Equation 11, when $|\log_2(\gamma)|<k_\gamma$ for some $k_\gamma$, the image processor treats the stretch differently, considering the stretch low enough to maintain temporal continuity. In an example, $k_\gamma=1$. Combining all the criteria together, there is a function, $\chi_{\Delta t}(p, t)$ that is used to gate temporal continuity. $\chi_{\Delta t}(p, t)=1$ if the projection of point p at a time $\Delta t$ later appears not to be occluded based on both the z test and the object ID test, and if the stretch is below a threshold. Otherwise, $\chi_{\Delta t}(p, t)=0$.

Goal Function for Temporal Case

In order to generalize the goal functions to the temporal case, consider spatio-temporal neighborhoods that track the same object points over time. The goal function can then be written as a sum over the portion of the spatio-temporal region that is not occluded, as in Equation 12, where the spatial weight $w(\Delta p)$ has become a spatio-temporal weight as in Equation 13.

$$G = \sum_{\delta p \in \Omega^*} \sum_{\Delta t \in \Lambda} w(\Delta p, \Delta t) \chi_{\Delta t}(p + \Delta p, t) g(p, \Delta p, t, \Delta t) \quad \text{(Eqn. 12)}$$

$$w(\Delta p, \Delta t) = \left(e^{-|\Delta p|^2/2\sigma_p^2}\right)\left(e^{-|\Delta t|^2/2\sigma_t^2}\right) \quad \text{(Eqn. 13)}$$

$$g(p,\Delta p,t,\Delta t)=w_a g_a(p,\Delta p,t,\Delta t)+w_b g_b(p,\Delta p,t,\Delta t)+w_c g_c(p,\Delta p,t,\Delta t) \quad \text{(Eqn. 14)}$$

As before, there are three components of the goal function, as indicated in Equation 14. Once again, the first two terms in the goal function express the desire for each neighborhood in the output to look like a corresponding neighborhood in the output style, and for each neighborhood in the input to look like a corresponding neighborhood of the input style. The third term of the goal function now promotes both spatial and temporal coherence, taking into account screen-space motion as well as occlusion relationships. The three terms of the goal function are illustrated in Equations 15-17.

$$g_a(p,\Delta p,t,\Delta t)=|\hat{I}_{t+\Delta t}(\pi_{\Delta t}(p+\Delta p,t+\Delta t))-\hat{S}(C_t(p,\Delta p))|^2 \quad \text{(Eqn. 15)}$$

$$g_b(p,\Delta p,t,\Delta t)=|I_{t+\Delta t}(\pi_{\Delta t}(p+\Delta p,t+\Delta t))-S(C_t(p,\Delta p))|^2 \quad \text{(Eqn. 16)}$$

$$g_c(p,\Delta p,t,\Delta t)=\min(|M_{t+\Delta t}(\pi_{\Delta t}(p+\Delta p,t+\Delta t))-C_t(p,\Delta p)|^2, r_{max}) \quad \text{(Eqn. 17)}$$

The propagation steps propagate candidate nearest-neighbor matches to neighbors in time as well as space. The random searches are as before, using the exponential distribution within the style images. This has been implemented on a cluster of eight quad core 2.8 GHz Intel™ Xeon X5560™ processors using OpenMPI™ software.

Time-Serial Processing

One disadvantage of the fully-parallel algorithm from a performance point of view is that the working set is very large due to the spatio-temporal neighborhood size. The necessary input and output images along with the associated orientation and velocity fields are more than is currently possible to maintain in a GPU, and the overhead of moving the data in and out of main memory as required by the fully-parallel process is very high. To bring animated image analogies onto a GPU, a related approach that serializes the computation over time can be used. In the time-serial process, the image processor still makes use of the velocity fields $V_t^+(p)$ and $V_t^-(p)$, as well as the occlusion function, $\chi_{\Delta t}(p, t)$. However, instead of achieving temporal continuity through the use of a temporal neighborhood with large extent, it is achieved with a series of forward and backward sweeps through time where a bonus (bias, etc.) is provided to maintaining offsets consistent with non-occluded advection.

To begin, the image processor first initializes the frames in the sequence with random offsets, and then performs a synthesis of the first frame using the single image process described above. Then, for the whole sequence, the image processor updates frame t+1 from frame t as follows.

For each pixel p, consider whether or not it was visible in the previous frame by consulting $\chi_{-1}(p, t+1)$. If the pixel was visible, interpolate $m_{t-1}(p-V_t^-)$ to compute an estimate of its prior match p_. In that interpolation, check to see if the bi-linear offset neighborhood is smooth. If $M_{t-1}(p+V_t^-)$ is, then compute p_ using bi-linear interpolation. Otherwise, compute p_ from the closest sample and its associated orientation field. Then, perform a full texture synthesis as for the single image process using a modified goal function as indicated in Equation 18, where b is a factor that provides a bonus to promote temporal coherence for using the advected offset.

$$G*(p) = \begin{cases} G(p)*b & \text{if p\_ exists and } p = p-; \\ G(p) & \text{otherwise} \end{cases} \quad \text{(Eqn. 18)}$$

After having processed the entire sequence forward through time as above, the image processor does a similar pass backwards through time. In the backwards pass, it computes $p_+$ based on $M_{t+1}(p+V_t^+)$ and $\chi1(p, t)$ and gives the goal function at time t a similar bonus of b for offsets advected backwards from time t+1. For example, the image processor might perform five sets of forward-backwards iterations.

Coarse-to-fine processing remains valuable with the time-serial algorithm. A process can begin by processing the entire sequence at a coarse spatial sampling with all the forwards and backwards passes, then up-sample to the next finest spatial level and repeat the process. Coarsening in the temporal dimension might also be useful.

Selection of Process

In current implementations, the time-serial algorithm is far faster than the fully-parallel algorithm. To begin with, the goal function evaluations of the time-serial process make do with examining only a spatial neighborhood rather than a larger spatio-temporal one. Also, since the working set fits on a GPU, the time-serial algorithm benefits from the additional parallelism the GPU offers as well as avoiding the synchronization overhead encountered while spreading the workload of the fully-parallel algorithm over a network-connected CPU cluster. Nonetheless, as hardware changes over time, the fully-parallel process may have increasing appeal. Two computing trends work to its benefit. Machines are becoming increasingly parallel, and the available memory is increasing. On a suitably connected future cluster of GPUs, a version of the fully parallel process could turn out to be the process of choice. Additionally, if temporal coarsening is incorporated into the fully-parallel process, the number of temporal samples in its spatio-temporal window can probably be made fairly small.

In any texture synthesis process that tries to achieve a high degree of temporal continuity, information must propagate along the paths, π, that describes the motion of object points through time. The two temporal processes described herein do this in ways that are analogous to the main approaches for linear filters. The fully-parallel algorithm operates similarly to linear finite impulse response (FIR) filters. It samples a temporal neighborhood around each evaluation point. The time-serial algorithm operates similarly to a recursive or infinite impulse response (IIR) filter. It uses the output at the previous time sample as input to its computation at the current sample. For large filter kernels, recursive filters generally require the least total work, but depending on the target hardware, they are sometimes outperformed by multi-resolution (pyramid) FIR implementations.

Handling Outlines

From the point of view of non-photorealistic rendering, outlines are of particular significance. Traditional computer graphics rendering creates perfect outlines, instantly distinguishable from the more organic shapes of hand-rendered imagery. As illustrated in the figures, an image analogies framework with an orientation field can produce lines that appear as if they were hand-rendered. In motion, however, organic outline shapes pose some additional problems.

The largest problem in motion is that while the synthesized outlines of the shapes may be nicely irregular, the irregularity is not shared by the velocity field. To put it differently, the synthesized outlines are intentionally displaced from the outlines of the input animation sequence to give them a hand-rendered look. That creates a misregistration between the synthesized outlines and the velocity field, which can lead to artifacts.

Figure 7:
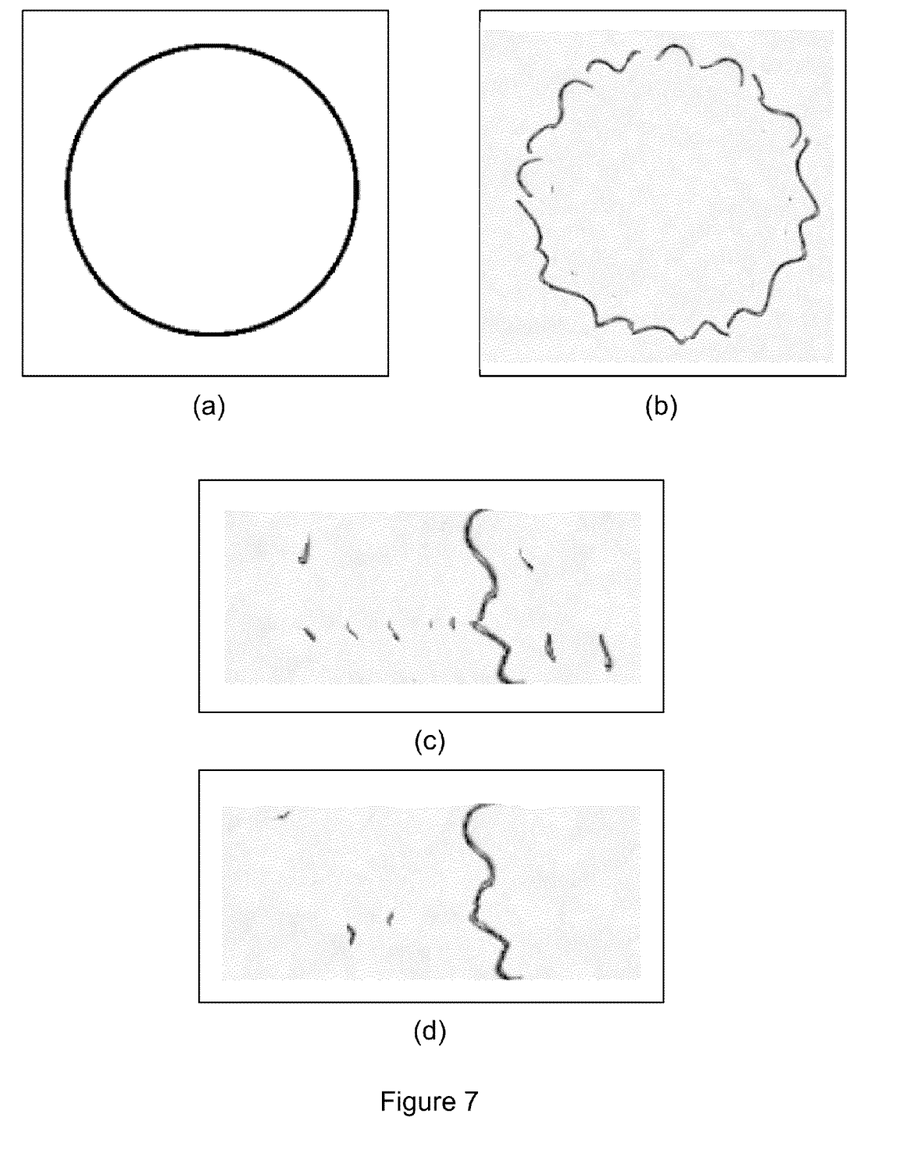
FIG. 7 illustrates effects of velocity offsets.

FIG. 7 illustrates this effect. In FIG. 7, the input image is a circle as shown by FIG. 7(a), which has a well-defined border that also defines the velocity field (e.g., the points inside the circle move together, whereas the points outside the circle are background and should stay put). FIG. 7(b) shows an output image that results from the application of the style shown in the lower portion of FIG. 3, which supplies a particularly large variation between the input and output lines.

In the input sequence, the input animation is of the circle translating at a fixed speed to the right. FIG. 7(c) shows a close-up of the kind of artifact that can occur. Pieces of the outline that are displaced far enough to the left of the input lines will inherit the velocity of the background instead of the velocity of the translating circle. When trying to maintain temporal continuity, the result can be a trail of little pieces of the lines left in the places where the outline was located on previous frames.

To combat the artifacts, the image processor can use one or both of the approaches that will now be described.

The first is to introduce "velocity offsets" into the mix. For each point p in the style output image, $\hat{S}$, the image processor computes an offset U(p)=p'−p to the nearest edge pixel p' in the input style, S. If there is no edge pixel within a maximum offset distance, set U(p)=0. This advects synthesized outlines by the velocity of the corresponding displaced input outline. FIG. 7(d) shows the improvement. Everywhere where $V_t^+(p)$ was previously used, instead use $V_t^+(p+U(M_t(p)))$. Not all artifacts are gone, but the regular trail of spots to the left of the vertical outline has been removed.

The second improvement for outlines is to use what [FEBVRE, S., AND HOPPE, H., ACM Trans. Graph. 25, 3, 541-548 (2006)] refers to as "feature distance." They observe that texture synthesis operates more successfully with structured textures if the textures are matched not only on their colors, but also on a distance field constructed from features. The image processor can take this into account to supplement both the input style and the input line-animations with distance fields constructed from the edge pixels. As a result, both I and S become 4-dimensional vectors (R, G, B, F) where F is the distance field. FIG. 7(b) shows the result of combining the distance field with the velocity offsets, showing a frame having a pleasing rendition of the circle in the supplied style with minimal artifacts.

CONCLUSION

Processes that can balance the difficult, conflicting requirements of non-photorealistic rendering of 3D computer graphic character animation has now been described. They achieve flatness, coherent motion and temporal coherence while also allowing for imperfect but temporally consistent rendering of outlines. They orient the output textures, take into account occlusions, and allow for controlled re-synthesis when objects approach or recede from the camera.

The time-serial process is particularly efficient at enforcing temporal continuity. By using a series of forward and backward passes through time, it is able to create a consistent temporal appearance of objects without excessive computation, making it possible to both widen the available range of styles where image analogies can be used, and turn the technique into a practical method for non-photorealistic rendering of animation.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. An animation processor comprising a processor, an instruction memory, a working memory, inputs and outputs, and comprising:
    an input for receiving an input animation sequence comprising a plurality of time-sequenced frames;
    storage for a style image pair, comprising an input style image and an output style image, wherein differences between the input style image and the output style image define a style for drawings and other visual elements;
    logic for generating an image orientation field for each time-sequenced frame from image data within the respective time-sequenced frame;
    logic for generating a style orientation field defined in a coordinate system of the input style image and the output style image;
    logic for calculating a velocity field from the time-sequenced frames;
    logic for generating an output animation sequence comprising output images that has temporal coherence and that takes on the style defined by the style image pair by using the image orientation fields, the style orientation field, and the velocity fields; and
    an output for outputting the output animation sequence.

2. The animation processor of claim 1, further comprising logic for processing occlusion and object movement in the input animation sequence.

3. The animation processor of claim 2, further comprising logic for identifying occlusions and changing weights of neighboring pixels around the occlusions in a goal seeking process.

4. The animation processor of claim 1, further comprising logic for evaluating a goal function to map points of each output image to points of the output style image.

5. The animation processor of claim 1, wherein the style image pair comprises a computer-drawn template image as the input style image and an artist-drawn rendering of the input style image as the output style image.

6. The animation processor of claim 4, further comprising logic for altering the goal function to reduce a weight of a temporal coherence component where occlusion is present or movement of objects in depth beyond a threshold occurs.

7. The animation processor of claim 1, further comprising:
    logic that uses the velocity field to derive point paths;
    logic for evaluating a goal function that considers the velocity field;
    logic for evaluating the point paths to determine the depth of points; and
    logic for determining, from the depth of points, when to lower a weight for a goal of temporal continuity in order to preserve a texture style that is independent of depth, thereby creating an impression of flatness in the output image.

8. The animation processor of claim 1, further comprising:
    logic for advecting forward and backward to get an advected result image from the velocity field;
    logic for goal seeking, using the advected result image to favor texture synthesis of the output images; and
    logic for generating the output images, having dependence on temporally near frames.

9. The animation processor of claim 8, further comprising logic to iterate over multiple advected result images.

10. The animation processor of claim 1, further comprising:
    logic for advecting forward or backward to get one advected result image from the velocity field;
    logic for goal seeking, using the one advected result image to favor texture synthesis of the output images; and
    logic for generating the output images, having dependence on temporally near frames.

11. The animation processor of claim 1, further comprising logic for iterating over a plurality of resolutions.

12. The animation processor of claim 1, further comprising logic for adjusting object boundaries based on variations between points in the output style image and points in the input style image.

13. A method, using an image processor capable of processing data representing image data, for generating a sequence of stylized output images from a sequence of input animation images, the method comprising:
    receiving an input animation sequence comprising a plurality of time-sequenced frames;
    receiving a style image package, the style image package comprising data including at least an input style image and an output style image, wherein differences between the input style image and the output style image define a style for drawings and other visual elements;
    generating an image orientation field for each time-sequenced frame from image data within the respective time-sequenced frame;
    calculating a velocity field from the time-sequenced frames;
    generating an output animation sequence comprising output images that has temporal coherence and that takes on the style defined by the style image pair by using the image orientation fields, the style orientation field, and the velocity fields; and
    outputting the output animation sequence.

14. The method of claim 13, further processing occlusion and object movement in the animation sequence.

15. The method of claim 13, further comprising identifying occlusions and changing weights of neighboring pixels around the occlusions in a goal seeking process.

16. The method of claim 13, further comprising evaluating a goal function to map points of each output image to points of the output style image.

17. The method of claim 13, wherein the style image pair comprises a computer-drawn template image as the input style image and an artist-drawn rendering of the input style image as the output style image.

18. The method of claim 16, further comprising altering the goal function to reduce a weight of a temporal coherence component where occlusion is present or movement of objects in depth beyond a threshold occurs.

19. The method of claim 13, further comprising:
using the velocity field to derive point paths;
evaluating a goal function that considers the velocity field;
evaluating the point paths to determine the depth of points; and
determining, from the depth of points, when to lower a weight for a goal of temporal continuity in order to preserve a texture style that is independent of depth, thereby creating an impression of flatness in the output image.

20. The method of claim 13, further comprising:
advecting forward and backward to get an advected result image from the velocity field;
evaluating a goal seeking function that depends on the advected result image, to favor texture synthesis of the output images; and
generating the output images, having dependence on temporally near frames.

21. The method of claim 20, further comprising iterating over multiple advected result images.

22. The method of claim 13, further comprising:
advecting forward or backward to get one advected result image from the velocity field;
evaluating a goal seeking function, using the one advected result image to favor texture synthesis of the output frame; and
generating the output images, having dependence on temporally near frames.

23. The method of claim 13, further comprising iterating over a plurality of resolutions.

24. The method of claim 13, further comprising adjusting object boundaries based on variations between points in the output style image and points in the input style image.

* * * * *